(12) United States Patent
Parkison et al.

(10) Patent No.: US 11,393,127 B2
(45) Date of Patent: Jul. 19, 2022

(54) 2D TO 3D LINE-BASED REGISTRATION WITH UNKNOWN ASSOCIATIONS

(71) Applicant: TOYOTA RESEARCH INSTITUTE, INC., Los Altos, CA (US)

(72) Inventors: Steven A. Parkison, Ann Arbor, MI (US); Jeffrey M. Walls, Mountain View, CA (US); Ryan W. Wolcott, Ann Arbor, MI (US); Mohammad Saad, San Mateo, CA (US); Ryan M. Eustice, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 81 days.

(21) Appl. No.: 16/834,466

(22) Filed: Mar. 30, 2020

(65) Prior Publication Data

US 2021/0082148 A1    Mar. 18, 2021

Related U.S. Application Data

(60) Provisional application No. 62/900,102, filed on Sep. 13, 2019.

(51) Int. Cl.
*G06T 17/20* (2006.01)
*G06T 7/80* (2017.01)
(Continued)

(52) U.S. Cl.
CPC .................. *G06T 7/80* (2017.01); *G01S 7/40* (2013.01); *G01S 7/497* (2013.01); *G01S 13/89* (2013.01);
(Continued)

(58) Field of Classification Search
None
See application file for complete search history.

(56) References Cited

U.S. PATENT DOCUMENTS 8,942,455 B2   1/2015   Chou et al.
9,646,361 B2   5/2017   Koo et al.
(Continued)

FOREIGN PATENT DOCUMENTS

EP    1752884 B1    4/2013

OTHER PUBLICATIONS

Zhao (Hough-Domain Image Registration By Metaheuristics) ICARCV 2006, 2006 9th International Conference on Control, Automation, Robotics and Vision (Year: 2006).*
(Continued)

*Primary Examiner* — Yanna Wu
(74) *Attorney, Agent, or Firm* — Dinsmore & Shohl LLP

(57) ABSTRACT

A system for determining the rigid-body transformation between 2D image data and 3D point cloud data includes a first sensor configured to capture image data of an environment, a second sensor configured to capture point cloud data of the environment; and a computing device communicatively coupled to the first sensor and the second sensor. The computing device is configured to receive image data from the first sensor and point cloud data from the second sensor, parameterize one or more 2D lines from image data, parameterize one or more 3D lines from point cloud data, align the one or more 2D lines with the one or more 3D lines by solving a registration problem formulated as a mixed integer linear program to simultaneously solve for a projection transform vector and a data association set, and generate a data mesh comprising the image data aligned with the point cloud data.

20 Claims, 7 Drawing Sheets

(51) Int. Cl.
*G06T 7/50* (2017.01)
*G06T 7/00* (2017.01)
*G01S 7/40* (2006.01)
*G01S 7/497* (2006.01)
*G01S 13/89* (2006.01)
*G01S 17/89* (2020.01)

(52) U.S. Cl.
CPC ............ *G01S 17/89* (2013.01); *G06T 7/50* (2017.01); *G06T 7/97* (2017.01); *G06T 17/20* (2013.01); *G06T 2207/10028* (2013.01)

(56) References Cited

U.S. PATENT DOCUMENTS

| | | | | |
|---|---|---|---|---|
| 10,318,822 | B2* | 6/2019 | Gao | G06K 9/00805 |
| 2009/0290771 | A1 | 11/2009 | Frank et al. | |
| 2019/0293756 | A1* | 9/2019 | Blaes | G01S 13/931 |

OTHER PUBLICATIONS

Khoo, Yuehaw, Kapoor, Ankur, "Non-Iterative Rigid 2D/3D Point-Set Registration Using Semidefinite Programming;" https://ieeexplore.ieee.org/document/7430328; Published: Mar. 10, 2016.

Přibyl, Bronislav et al., "Camera Pose Estimation from Lines using Plucker Coordinates;" https://arxiv.org/pdf/1608.02824.pdf, Published: Aug. 9, 2016.

Izatt et al., "Globally Optimal Object Pose Estimation in Point Clouds with Mixed-Integer Programming," https://groups.csail.mit.edu/robotics-center/public_papers/Izatt17.pdf, Published: Jun. 26, 2017.

International Search Report and Written Opinion with notification transmittal dated Nov. 27, 2020 in related International Application No. PCT/US2020/050706 (16 pages total).

Goebbels Steffen et al: "Line-based Registration of Photogrammetric Point Clouds with 3D City Models by Means of Mixed Integer Linear Programming." Proceedings of the 13th International Joint Conference on Computer Vision, Imaging and Computer Graphics Theory and Applications, Institute for Pattern Recognition, Faculty of Electrical Engineering and Computer Science, Niederrhein University of Applied Sciences, Reinarzstr. 49, 47805 Krefeld, Germany. Published: Jan. 1, 2018.

Izatt Gregory et al: Globally Optimal Object Pose Estimation in Point Clouds with Mixed-Integer Programming : The 18th International Symposium ISRR"In: Field and Service Robotics", Springer International Publishing, Cham. Published: Nov. 28, 2019.

* cited by examiner

2D TO 3D LINE-BASED REGISTRATION WITH UNKNOWN ASSOCIATIONS

CROSS-REFERENCE TO RELATED APPLICATION

This application claims to the benefit of U.S. Provisional Application No. 62/900,102 filed Sep. 13, 2019, the disclosure of which is incorporated herein by reference in its entirety.

TECHNICAL FIELD

The present specification generally relates to systems and methods for determining rigid-body transformations between 2D and 3D data with known or unknown data associations. More specifically, the present specification discloses systems and methods for calibrating and/or localizing sensors within an environment utilizing 2D and 3D line-based registrations.

BACKGROUND

Determining a rigid-body transformation between 2D image data and 3D point cloud data has applications for mobile robotics, including sensor calibration and localization into a prior map. Common approaches to 2D-3D registration use least-squares solvers assuming known data associations between 2D line and 3D line data, which are often provided by heuristic front-ends. 2D image and 3D point cloud data provide complementary representations of an environment. 3D point clouds provide important metric information while 2D images report a rich visual representation of an environment. The rigid body transform between imaging and point cloud sensors must be accurately known in order to effectively perform geometric inference on their data. 2D to 3D registration is the problem that seeks to determine this transformation. Tasks that rely on accurate solutions to this problem include determining the extrinsic calibration between camera and light detection and ranging (LIDAR) sensor, and localizing a camera into a 3D map. This problem is a subset of the larger registration problem, which estimates the transform between two inputs.

There are two variables generally considered when solving the registration problem: the rigid-body transformation variable and the variable that represents the data associations between parts of the 2D data and parts of the 3D data. The data association is a latent variable that plays a large role in most approaches to the registration problem. Prior methods solve the registration problem with a set of known data associations. However, in circumstances when reliable knowledge with respect to the transformation or associations is not available, this assumption can be problematic. While some methods to handle unknown associations exist, such as the algorithms random sample consensus (RANSAC) or Soft assign Pose from Orthography and Scaling with ITerations (SoftPOSIT), these methods rely on randomly sampling possible associations until enough inliers are found or iteratively switching between finding the best associations and finding the best transformation, respectively.

Accordingly, there is a need for systems and methods for calibrating sensors and/or localizing sensors within an environment defined by map data utilizing 2D and 3D line-based registrations with known or unknown initial data associations.

SUMMARY

In one embodiment, a system includes a first sensor configured to capture image data of an environment, a second sensor configured to capture point cloud data of the environment, and a computing device communicatively coupled to the first sensor and the second sensor. The computing device is configured to: receive the image data from the first sensor and the point cloud data from the second sensor, parameterize one or more 2D lines from the image data, parameterize one or more 3D lines from the point cloud data, align the one or more 2D lines with the one or more 3D lines by solving a registration problem formulated as a mixed integer linear program to simultaneously solve for a projection transform vector and a data association set, and generate a data mesh comprising the image data aligned with the point cloud data based on the projection transform vector.

In some embodiments, a system includes a first sensor configured to capture data defining an environment, where the data comprises at least one of image data or point cloud data and a computing device communicatively coupled to the first sensor. The computing device is configured to: receive data from the first sensor, retrieve map data of the environment, parameterize one or more lines from the data received from the first sensor, parameterize one or more lines from the map data, align the one or more lines parameterized from the data received from the first sensor with the one or more lines parameterized from the map data by solving a registration problem formulated as a mixed integer linear program to simultaneously solve for a projection transform vector and a data association set, and generate a data mesh comprising the data received from the first sensor aligned with the map data based on the projection transform vector.

In some embodiments, a system includes a computing device configured to retrieve image data captured by a camera of an environment, retrieve point cloud data of the environment, parameterize one or more lines from the image data, parameterize one or more lines from the point cloud data, align the one or more lines parameterized from the image data with the one or more lines parameterized from the point cloud data by solving a registration problem formulated as a mixed integer linear program to simultaneously solve for a projection transform vector and a data association set, and generate a data mesh comprising the image data aligned with the point cloud data based on the projection transform vector.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
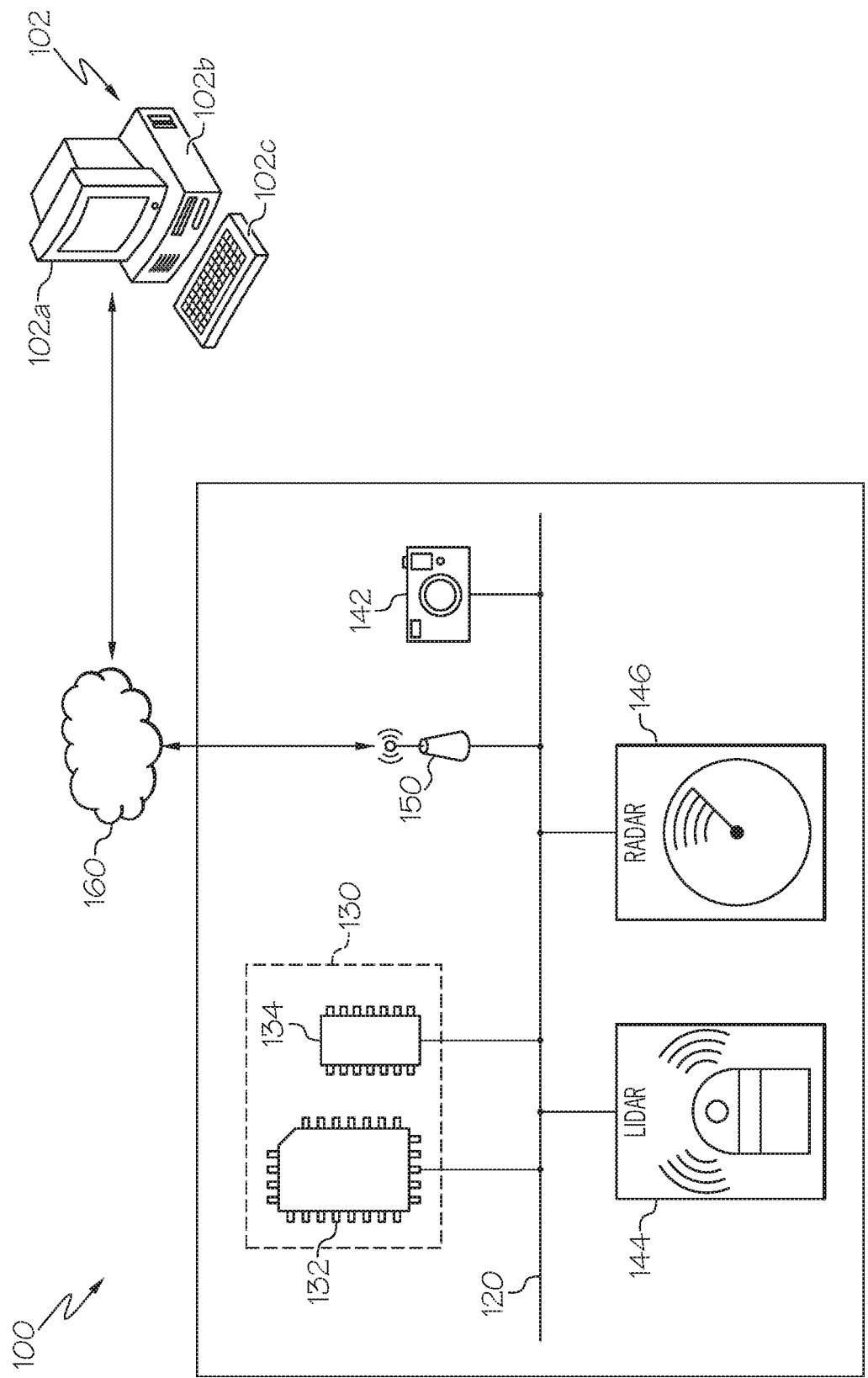
FIG. 1 depicts an example system for obtaining 2D image data and 3D point cloud data and determining a rigid-body transformation between the 2D image data and the 3D point cloud data according to one or more embodiments shown and described herein.

Embodiments of the present disclosure are directed to determining a rigid-body transformation between 2D image data and 3D point cloud data. The systems and methods for determining the rigid-body transformation between 2D image data and 3D point cloud data that are described herein may be implemented in applications such as mobile robotics, autonomous vehicles, automation equipment, manufacturing assembly lines, and the like. The process of determining a rigid-body transformation between 2D image data and 3D point cloud data may be utilized by these applications for operations such as sensor calibration and/or localization in an environment defined by map data.

More specifically, the present disclosure is directed to a robust line-based 2D-3D registration algorithm that is formulated as a Mixed Integer Linear Program (MILP) to simultaneously solve for the correct transformation and data association between the 2D and 3D data. The line based 2D-3D registration algorithm formulated herein is robust to outliers, delivers versatility in implementation as off-the-shelf linear program solvers may be used, and is capable of operating when associations between 2D lines and 3D lines are unknown. Furthermore, as discussed in more detail below, the present systems and methods for determining the rigid-body transformation between 2D image data and 3D point cloud data has been shown to outperform other approaches to line-based registration.

Embodiments described herein include systems and methods configured to capture 2D image data and 3D point cloud data from environments. The 2D image data and 3D point cloud data may be collected from driving environments, building interiors, or other locations where a robotic device or the system may be implemented. In some embodiments, the system includes parameterization logic which is configured to determine one or more lines from 2D image data and 3D point cloud data. Using the lines determined by the parameterization logic, the system may implement alignment logic configured to formulate and/or solve the registration problem. The registration problem is formulated as a MILP such that a projection transform vector and a data association set may be determined. The approach disclosed herein includes a method where the associations are formulated as binary variables in a linear problem, which allows the registration problem to be turned into a MILP. The registration problem, parameterization logic, and alignment logic will be described in more detail herein. Furthermore, the alignment logic generates a data mesh comprising the 2D image data aligned with the 3D point cloud data based on the projection transform vector. As used herein, "data mesh" may be any form of data representation or data format that defines the alignment of the 2D image data with 3D point cloud data based on the solution to the registration problem. That is, the data mesh may be a model, a matrix, an image with depth data annotated therein or the like that represents the alignment of the 2D image data with 3D point cloud data.

The projection transform vector and the data association set define the transformation that makes the data the most consistent between the two modalities (2D lines and 3D lines). A unique aspect of the projection operation disclosed herein is that the operation is line preserving. This means that any three collinear points in the 3D point cloud space are also collinear after the projection operation. Additionally, another unique aspect of the present disclosure is that when data associations are not known (i.e., when the association between a 2D line from image data and a 3D line from 3D point cloud data is not known) the system may implement a nearest neighbor heuristic.

In some embodiments, a projection transform vector and a data association set may be used to perform a calibration operation on a sensor, such as a camera, LIDAR sensor, RADAR sensor, or the like. Furthermore, the projection transform vector and a data association set may be used to localize a sensor in an environment. For example, the location of a camera (and/or a vehicle coupled to the camera) may be localized within an environment by determining the projection transform vector and data association set between the 2D image data captured by the camera and map data comprising 3D point cloud data. That is, by using an initial known point of view of the 3D point cloud data for the alignment operation of the 2D image data to the 3D point cloud data, the resulting projection transform vector gives the translation and rotation from the initial known point of view of the 3D point cloud data to the location where the 2D image data of the environment expressed in the map data was captured. In some instances, the map data of the environment may be a 3D point cloud defining a 3D model of the environment. At least these implementations of the systems and methods for determining a rigid-body transformation between 2D image data and 3D point cloud data will be described in more detail herein.

The following will now describe these systems and methods in more detail with reference to the drawings and where like numbers refer to like structures.

Referring to FIG. 1, an example system 100 for obtaining 2D image data and 3D point cloud data and determining a rigid-body transformation between the 2D image data and the 3D point cloud data is depicted. FIG. 1 depicts a system 100 including a computing device 102 communicatively coupled to an electronic controller 130 and one or more sensors such as a camera 142, a LIDAR sensor 144, and/or a RADAR sensor 146, via a network 160. The electronic controller 130, the camera 142, the LIDAR sensor 144, and the RADAR sensor 146 may be communicatively coupled to the network 160 by way of the network interface hardware 150. While FIG. 1 depicts the computing device 102 communicatively coupled to the other components via the network 160, this is only one example. In some embodiments, the computing device 102 is communicatively coupled to the other components directly, for example, via a communication path 120. That is in some embodiments, the computing device 102, the electronic controller 130, the camera 142, the LIDAR sensor 144, and the RADAR sensor 146 may each be implemented within a vehicle a robot, or other device.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the computing device 102 may include a display 102a, a processing unit 102b (e.g., having at least a processor and memory) and an input device 102c, each of which may be communicatively coupled together and/or to the network 160. The computing device 102 may be configured to carry out processes for determining the rigid-body transformation between 2D image data and 3D point cloud data. The computing device 102 will be described in more detail with respect to FIG. 2.

The electronic controller 130 may be a vehicle ECU or robotic control device. The electronic controller 130 includes a processor 132 and a non-transitory computer readable memory 134. Accordingly, the processor 132 may be a control unit, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The electronic controller 130 may be communicatively coupled to a camera 142. The camera 142 may be any device having an array of sensing devices capable of detecting radiation in an ultraviolet wavelength band, a visible light wavelength band, and/or an infrared wavelength band. The camera 142 may have any resolution. The camera 142 may be an omni-directional camera, or a panoramic camera. In some embodiments, one or more optical components, such as a mirror, fish-eye lens, or any other type of lens may be optically coupled to each of the camera 142. In some embodiments, the camera 142 may be an RGB-D type camera such as an Intel® RealSense™ Depth Camera or similar device capable of capturing depth measurements in an environment or capturing image data capable of being analyzed to determine depths in an environment based on the image data. In embodiments described herein, the camera 142 may capture 2D image data of an environment. For example, the camera 142 may be coupled to a vehicle, as depicted and described with reference to FIG. 3, for capturing 2D image data of the surroundings around the vehicle.

The system 100 may also include a light detection and range (LIDAR) sensor 144. The LIDAR sensor 144 is communicatively coupled to the communication path 120 and, via the network interface hardware 150, to the computing device 102. The LIDAR sensor 144 uses pulsed laser light to measure distances from the LIDAR sensor 144 to objects that reflect the pulsed laser light. A LIDAR sensor 144 may be made as solid-state devices with few or no moving parts, including those configured as optical phased array devices where its prism-like operation permits a wide field-of-view without the weight and size complexities associated with a traditional rotating LIDAR sensor 144. The LIDAR sensor 144 is particularly suited to measuring time-of-flight, which in turn can be correlated to distance measurements with objects that are within a field-of-view of the LIDAR sensor 144. By calculating the return time difference of the various wavelengths of the pulsed laser light emitted by the LIDAR sensor 144, a digital 3D representation (e.g., a point cloud representation) of a target or environment may be generated. The pulsed laser light emitted by the LIDAR sensor 144 may in one form be operated in or near the infrared range of the electromagnetic spectrum, with one example having emitted radiation of about 905 nanometers. Sensors such as the LIDAR sensor 144 can be used by vehicle to provide detailed 3D spatial information on an environment around the vehicle, as well as the use of such information in the service of systems for vehicular mapping, navigation and autonomous operations, especially when used in conjunction with geo-referencing devices such as a GPS system or a gyroscope-based inertial navigation unit (INU, not shown) or related dead-reckoning system, as well as non-transitory computer readable memory 134 (either its own or memory of the electronic controller 130 and/or the computing device 102).

In some embodiments, the one or more sensors of the system 100 may include a RADAR sensor 146. The RADAR sensor 146 is communicatively coupled to the communication path 120 and the electronic controller 130 and/or the computing device 102. A RADAR sensor 146 is a system which employs a method of using radio waves to determine the range, angle, and relative velocity of objects. In some embodiments, the RADAR sensor 146 may generate a digital 3D representation (e.g., a point cloud representation) of a target or environment. The RADAR sensor 146 may be used in conjunction with the camera 142, the LIDAR sensor 144, and/or other sensors to obtain information about a vehicle's surroundings.

The RADAR sensor 146 generally utilizes frequencies in the 24 GHz band in both the narrow band and ultra-wide band unregulated spectrums. However, new spectrum regulations have curtailed the use of the 24 GHz band so some systems may now utilize frequencies in the 77-81 GHz band. Although, these bands are typically used in automotive RADAR sensors, the scope of the systems and methods described herein are not limited to these frequency ranges. In general, the RADAR sensor 146 emits a high-energy ping and measures the time it takes to receive a reflection. However, some systems implement a frequency-modulated continuous wave that transmits a "chirp" that is a frequency sweep across the bandwidth of the system. Objects in the path of the signal then reflect this chirp back. The difference between the frequency of the chirp coming out of the transmitter and the frequency of the received reflected signal, at any one time, is linearly related to the distance from the transmitter to the object.

Localization using the RADAR sensor 146 depends, in part, on the resolution and accuracy of this distance measurement. The resolution may determine how far apart objects need to be before they are distinguishable as two objects. The accuracy is just that: the accuracy of the distance measurement. The error in the distance measurement and the minimum resolvable distance are inversely proportional to the bandwidth of the chirp. Due to the width of available frequencies, for example, the move from 24 GHz to 77 GHz may achieve 20× better performance in range resolution and accuracy. The range resolution of a 77 GHz system can be 4 cm versus 75 cm for 24 GHz radar, which may allow for better detection of multiple objects that are close together.

Although FIG. 1 depicts a RADAR sensor 146, some systems 100 described herein may not include a RADAR sensor 146. Alternatively, a system 100 may include multiple RADAR sensors 146 positioned at various locations on the vehicle to detect objects within the environment of the vehicle in various fields of view. Additionally, it should be understood that references herein to "sensors" may refer to any one of the aforementioned sensors, the cameras 142, the LIDAR sensor 144, the RADAR sensor 146, or any other sensor known to those in the art.

Still referring to FIG. 1, the system 100 may include network interface hardware 150 coupled to the communication path 120 and communicatively coupled to the electronic controller 130. The network interface hardware 150 may be any device capable of transmitting and/or receiving data via a network 160. Accordingly, network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 150 includes hardware configured to operate in accordance with the Bluetooth wireless communication protocol. In another embodiment, network interface hardware 150 may include a Bluetooth send/receive module for sending and receiving Bluetooth communications to/from a network 160.

In some embodiments, the system 100 may be communicatively coupled to nearby vehicles, other robots and/or other computing devices (e.g., a remotely located device such as the computing device 102) via the network 160. In some embodiments, the network 160 is a personal area network that utilizes Bluetooth technology to communicatively couple the system 100 and the nearby vehicles. In other embodiments, the network 160 may include one or more computer networks (e.g., a personal area network, a local area network, or a wide area network), cellular networks, satellite networks and/or a global positioning system and combinations thereof. Accordingly, the system 100 can be communicatively coupled to the network 160 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 2:
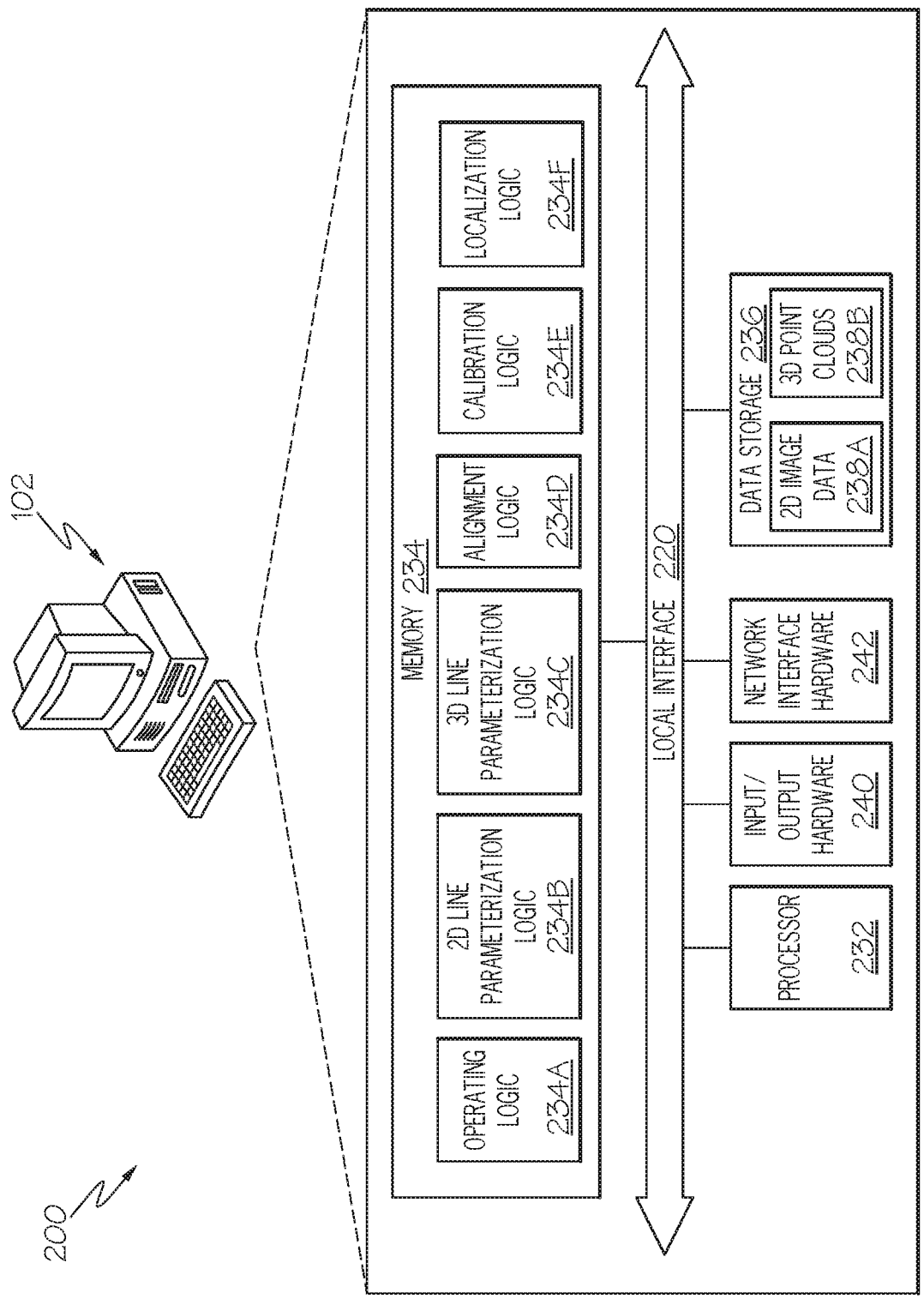
FIG. 2 depicts an illustrative schematic of a computing device for determining the rigid-body transformation between 2D image data and 3D point cloud data according to one or more embodiments shown and described herein.

Referring now to FIG. 2, an illustrative schematic of the computing device 102 for determining the rigid-body transformation between 2D image data 238A and 3D point cloud data 238B is depicted. The computing device 102 may be integrated within a common apparatus such as a vehicle, robotic system or the like or may be remotely located and communicatively coupled to the sensors such as the camera 142, the LIDAR sensor 144, the RADAR sensor 146, and/or the like. The computing device 102 may include several components communicatively coupled via a local interface 220. The local interface 220, similar to the communication path 120 disclosed and described with reference to FIG. 1, may be implemented as a bus or other interface to facilitate communication among the components of the computing device 102.

The computing device 102 may include a processor 232, a memory module 234, a data storage component 236, which may store 2D image data 238A and/or 3D point cloud data 238B, input/output hardware 240, and network interface hardware 242. The memory module 234 may be machine readable memory (which may also be referred to as a non-transitory processor readable memory). The memory module 234 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. The memory module 234 may be a component similar to the non-transitory computer readable memory 134 disclosed and described with reference to FIG. 1. Additionally, the memory module 234 may be configured to store operating logic 234A, 2D parameterization logic 234B, 3D parameterization logic 234C, alignment logic 234D, calibration logic 234E, and/or localization logic 234F (each of which may be embodied as a computer program, firmware, or hardware, as an example).

The processor 232 may include any processing component(s) configured to receive and execute programming instructions (such as from the data storage component 136 and/or the memory module 234). The processor 232 may be a component similar to the processor 132 disclosed and described with reference to FIG. 1. The instructions may be in the form of a machine readable instruction set stored in the data storage component 236 and/or the memory module 234. The input/output hardware 240 may include a monitor, keyboard, mouse, printer, camera, microphone, speaker, and/or other device for receiving, sending, and/or presenting data. The network interface hardware 242 may include any wired or wireless networking hardware, such as a modem, LAN port, Wi-Fi card, WiMax card, mobile communications hardware, and/or other hardware for communicating with other networks and/or devices. The network interface hardware 242 may be a component similar to the network interface hardware 150 disclosed and described with reference to FIG. 1.

It should be understood that the data storage component 236 may reside local to or remote from the computing device 102 and may be configured to store one or more pieces of data for access by the computing device 102 and/or other components. As illustrated in FIG. 1, the data storage component 236 may store 2D image data 238A and 3D point cloud data 238B. The 2D image data 238A may include images of an environment captured from one or more sensors of the system 100, such as a camera 142. The 3D point cloud data 238B may include one or more sets of data points in space. Point clouds are generally produced by 3D scanners, which measure many points on the external surfaces of objects around them. For example, 3D scanners may include the LIDAR sensor 144, the RADAR sensor 146, an RGB-D camera system, or other sensor. In some embodiments, the 2D image data 238A and/or 3D point cloud data 238B may include parameterized line references annotated within the data sets. In some embodiments, the 3D point cloud data 238B may represent a 3D model or map data of an environment.

In some embodiments, the 2D image data 238A and/or the 3D point cloud data 238B is received from the sensors (e.g., the camera 142, the LIDAR sensor 144, and/or the RADAR sensor 146) observing an environment. As described in more detail herein, the system 100 seeks to align 2D image data 238A with its corresponding 3D point cloud data 238B. The alignment process is also referred to as a transformation between the 2D image data 238A and the 3D point cloud data 238B. Typically, the transformation includes determining a solution to a registration problem which provides translation and/or rotation values that align one set of data with another, for example, aligning 2D image data 238A with its corresponding 3D point cloud data 238B. In some embodiments, the alignment process may also include scaling the data. For example, 2D image data 238A may be captured at a greater magnification than that of the corresponding 3D point cloud data 238B. As such, one or both sets of data may need to be scaled to achieve an alignment.

Referring now to the memory module 234, the memory module 234 includes logic for carrying out operations within the computing device 102 and/or the system 100. In some cases, the memory module 234 may also store data such as 2D image data 238A and/or 3D point cloud data 238B. For example, the memory module 234 may include are the operating logic 234A, 2D parameterization logic 234B, 3D parameterization logic 234C, alignment logic 234D, calibration logic 234E, and/or localization logic 234F. The operating logic 234A may include an operating system and/or other software for managing and interfacing with components of the system and/or of the electronic controller 130.

The 2D parameterization logic 234B includes logic for parameterizing lines within 2D image data 238A. For example, parameterizing lines within 2D image data 238A may include a method of identifying edges (i.e., boundaries between regions with relatively distinct gray levels). Other methods may include a convolution based technique which produces an image description of the thin lines in an input image. For example, a convolution kernel may be tuned to detect the presence of lines of a particular width and/or orientation. Regardless of the method implemented to parameterize 2D lines from image data, the 2D parameterization logic 234B generates a plurality of lines representing the image for use in the alignment process with the parameterized lines from the 3D point cloud data 238B.

The 3D parameterization logic 234C includes logic for parameterizing lines within 3D point cloud data 238B. For example, but without limitation, the 3D parameterization logic 234C may implement an approach where the parameterized lines, L, from the 3D point cloud data 238B are represented by Plücker Coordinates. For example, if $p_s$ is a point in 3-dimensional space $R^3$ that represents the start of a 3D line segment and $p_e$ is the end, the corresponding Plücker Coordinates can be computed as $$L = \begin{bmatrix} p_e \times p_s \\ p_e - p_s \end{bmatrix},$$

where $p_e \times p_s$ represents the normal of the line and $p_e - p_s$ is the direction of the line. To transform Plücker coordinates, the following 6×6 line transform matrix, $\tau_{AB}$, is used:

$$\tau_{AB} = \begin{bmatrix} R & [t]_x R \\ 0 & R \end{bmatrix},$$

where R represents a rotation matrix and $[\cdot]_x$ represents the operation of turning a translation in $R^3$ into a skew symmetric matrix. Accordingly, the 3D parameterization logic 234B generates a plurality of lines representing the 3D point cloud data 238B for use in the alignment process with the parameterized lines from the 2D image data 238A.

Still referring to FIG. 2, the alignment logic 234D is configured to obtain 2D and 3D parameterized line data and determine a translation and/or rotation value and optionally determine data associations between the 2D and 3D line data. As stated above, the alignment process is also referred to as a transformation between the 2D image data 238A and the 3D point cloud data 238B. Typically, the transformation includes determining a solution to a registration problem which provides translation values and/or rotation values that align one set of data with another, for example, aligning 2D image data 238A with its corresponding 3D point cloud data 238B. In the present disclosure the alignment logic 234D is configured to determine the correct transformation, $T_{AB}$, that transforms a set of 3D points, $p_n^B$, in reference frame B, $\{p_n^B\}$, $p_n^B \in \mathbb{R}3$, into the reference frame A of a set of 2D pixels, $\{i_m^A\}$, $i_m^A \in \mathbb{R}^2$, given a projection from 3D to 2D provided by camera intrinsic matrix K. In order to reduce the dimensionality of the problem, sparser features may be used for the transformation. Additionally, the alignment operation, which may also be referred to as the projection operation, is line preserving. This means that any three collinear points in $\mathbb{R}^3$ are also collinear after the projection operator.

In other words the alignment logic 234D seeks to solve the unique registration problem expressed as Equation 1, below $$\underset{p}{\mathrm{argmin}} \sum_{\{n,m\} \in I} \|M^{\{m,n\}} p\| \qquad \text{Eq. 1}$$

where p represents the projection transform vector, I represents the data association set, n represents a 3D line, and m represents a 2D line, and M the measurement matrix.

In view of an approach to line-based registration that seeks to minimize the between image line normal and normal of 3D lines available, for example, as the first half of Plücker coordinates, a transformation matrix may be expressed as Equation 2, below.

$$P_{AB} = [R[t]_\times R] \qquad \text{Eq. 2}$$

Following the equality expression of Equation 3, below, and by vectorising the matrix P into a p, an 18×2 measurement matrix $M^{\{n,m\}}$ structured as Equation 4, below, is achieved for an association between 3D line $L_n^B$ and 2D line $L_m^A$.

$$l_n^A \approx P_{AB} L_m^B \qquad \text{Eq. 3}$$

$$M^{\{m,n\}} = \begin{bmatrix} l_{n[3]}^A L_{m[1]}^B & 0 & -l_{n[1]}^A L_{m[1]}^B \cdots & l_{n[3]}^A L_{m[6]}^B & 0 & -l_{n[1]}^A L_{m[6]}^B \\ 0 & l_{n[3]}^A L_{m[1]}^B & -l_{n[2]}^A L_{m[1]}^B & 0 & l_{n[3]}^A L_{m[6]}^B & -l_{n[2]}^A L_{m[6]}^B \end{bmatrix} \qquad \text{Eq. 4}$$

In embodiments where the associations are known they be entered in as set A, which makes the registration problem expressed as Equation 1, above. However, even if the set is not provided, an initial guess for the projection transformation P may be made by using a nearest neighbor heuristic. In either instance, the alignment logic 234D is configured to minimize Equation 1 when no prior for P or I are available.

An advantage to the formulation of the registration problem in Equation 1 is that the residual (i.e., error in a result) is linear with respect to the projection parameter. While some approaches may include solving this problem for the $L_2$ norm by assembling $M_{\{n,m\}}$ into a single matrix and then performing a SVD decomposition to find the null space of the combined measurement matrix, a more robust approach, which is taught herein, is to minimize the $L_1$ norm of Equation 1.

Furthermore, it has been determined that in order for the alignment logic 234D to solve for the projection transform vector p and the data association set I, a binary variable $s_{mn}$ that indicates if the lines $L_m$ and $l_n$ are associated or not is needed. That is, if the lines are associated the value is 0. Finally, adding a slack variable a that is equivalent to the $L_1$ norm a mixed integer linear program, expressed as Equation 6, below, may be generated.

$$\min_{p,s,\alpha} \sum_n \sum_m \alpha_{nm} \qquad \text{Eq. 6}$$

$$\text{s.t. } M_{\{m,n\}} p - \lambda s_{nm} < \alpha_{nm}$$

$$M_{\{m,n\}} p + \lambda s_{nm} < -\alpha_{nm}$$

$$\sum_{j=0}^{M} s_{jn} = M - 1$$

$$\sum_{j=0}^{N} s_{mj} = N - 1$$

$$\alpha_{nm} \geq 0$$

$$s_{nm} \in \{0,1\}$$

In some embodiments, to handle any outlier situations the equality $\sum_{j=0}^{M} s_{jn} = M-1$ can be changed to $\sum_{j=0}^{M} s_{jn} \geq M-1$ along with similar changes to the summation over the other dimensions of s. Moreover, the alignment logic 234D in some instances can be further configured to leverage field of view constraints. For example, if there is a match for a 3D line $L_m$, some part of it must have been projected into the image plane. This can be approximated with the following equations, Equation 7 and Equation 8.

$$\frac{u_{max} - c_u}{f_u} (R_3 \cdot p + t_{max}) \geq (R_1 \cdot p + t_{max}) \qquad \text{Eq. 7}$$

$$\frac{u_{max} - c_u}{f_u} (R_3 \cdot p + t_{max}) \geq (R_2 \cdot p + t_{max}) \qquad \text{Eq. 8}$$

In some embodiments, the alignment logic 234D is configured such that the MILP is constrained to SE(2). This reduces the dimensionality of the problem and speeds up the process of finding the solution. For example, the translations can be constrained along the y-axis and -z axis and the rotations around the x-axis of a coordinate space defining the 3D point cloud data 238B and 2D image data 238A. This may be accomplished by adding constraints to the transformation matrix P, as shown below in Equation 9.

$$P = \begin{bmatrix} \begin{bmatrix} 1 & 0 & 0 \\ 0 & c_x & -s_x \\ 0 & s_x & c_x \end{bmatrix} \begin{bmatrix} 0 & -z & y \\ z & 0 & 0 \\ -y & 0 & 0 \end{bmatrix} \begin{bmatrix} 1 & 0 & 0 \\ 0 & c_x & -s_x \\ 0 & s_x & c_x \end{bmatrix} \end{bmatrix} \qquad \text{Eq. 9}$$

$$= \begin{bmatrix} 1 & 0 & 0 & 0 & -c_x z & s_x z + c_x y \\ 0 & c_x & -s_x & z & 0 & 0 \\ 0 & s_x & c_x & -y & 0 & 0 \end{bmatrix}$$

Still referring to FIG. 2, the alignment logic 234D is configured to obtain 2D and 3D parameterized line data and determine a translation and/or rotation value and optionally determine data associations between the 2D and 3D line data. The above described equations are implemented by the alignment logic 234D to obtain the projection transform vector (e.g., defining translation and rotation values) and data association set, which identifies which 2D lines correspond to the 3D lines. As described above, the method of determining the projection transform vector and data association between the 2D and 3D line data is accomplished by configuring and solving the registration problem as a MILP. Some advantages to solving a registration problem formulated as a MILP are that data associations do not need to be known prior to formulation, configuring constraints for the MILP can be done in a straight forward manner, the MILP may be solved using readily available solvers which can reduce implementation time while maintaining or improving results, and the results may be used for calibration of sensors and/or localization operations.

Once the alignment logic 234D is executed by the system 100, the computing device 102 may further carryout a calibration operation or a localization operation based on the projection transform vector. The calibration operation may be defined by calibration logic 234E which is configured to utilize one calibrated sensor's data along with the projection transform vector to determine calibration parameters for another sensor. For example, with reference to FIG. 3, a vehicle 110 may include a camera 142 and a LIDAR sensor 144. The camera 142 is configured to capture 2D image data 238A of the environment. The LIDAR sensor 144 is configured to capture 3D point cloud data 238B of the same environment or at least an overlapping portion of the environment around the vehicle 110. There may be a case where either the camera 142 or the LIDAR sensor 144 is calibrated but the other's calibration needs to be verified and/or updated. In a case where the camera 142 is calibrated, that is, the extrinsic and/or intrinsic calibration values of the camera 142 are known, the calibration logic 234E may be implemented to calibrate (i.e., verify and/or update) the extrinsic and/or intrinsic calibration values of the LIDAR sensor 144. The camera 142 and the LIDAR sensor 144 both capture their respective data of the environment and input the 2D image data 238A and the 3D point cloud data 238B into the system 100. The system 100 either through the electronic controller 130 and/or through a computing device 102 such as described with reference to FIG. 2, implements a method for example as described and depicted with reference to FIG. 4, which will be described in more detail herein. Once the projection transform vector is determined based on the 2D image data 238A and the 3D point cloud data 238B captured by the camera 142 and the LIDAR sensor 144, respectively, the calibration logic 234E utilizes the values determined in the projection transform vector to verify and update the calibration of the LIDAR sensor 144. In other words, if the projection transform vector determines there is a translation and/or a rotation between the 2D image data 238A and the 3D point cloud data 238B, then the translation and/or the rotation values may be implemented in the LIDAR sensor 144 such that future 3D point cloud data 238B aligns with the 2D image data 238A captured by the camera 142. The opposite operation may also be performed in a case where the calibration of the LIDAR sensor 144 is known and the calibration of the camera 142 needs to be verified and/or updated.

In some embodiments, the systems and methods for determining the rigid-body transformation between 2D image data 238A and 3D point cloud data 238B may be used for localizing a sensor capturing a 2D image or 3D point cloud of an environment within the environment. The localization operation described herein may use prior map data defining an environment with navigation coordinates and visually (e.g., with 2D image data 238A) and/or spatially (e.g., with 3D point cloud data 238B). For example, a vehicle 110 (FIG. 3) may include a camera 142 and/or a LIDAR sensor 144 that captures 2D image data 238A or 3D image data of the environment. The localization operation, which is described in more detail with reference to FIG. 5, implements localization logic 234F to determine a projection transform vector between the captured 2D image data 238A or 3D point cloud data 238B and the prior map data. The prior map data may be 2D image data 238A of the environment from a known location defined by navigation coordinates (e.g., navigation coordinates may include longitude, latitude, altitude, roll, pitch, and/or yaw). The localization logic 234F determines the navigation coordinates from where the 2D image data 238A or 3D point cloud data 238B was captured by applying the projection transform vector (i.e., for example applying the translation and/or rotation values) to the navigation coordinates of the prior map data. In other words, given the navigation coordinates of the prior map data and the translation and rotation values defined in the projection transform vector the coordinates from where the 2D image data 238A or the 3D point cloud data 238B was captured from can be determined. As such, a localization of the vehicle, robot, or other system may be determined.

The aforementioned logic modules will be described in additional detail with respect to FIGS. 4 and 5 herein. However, it should be noted that while the previously disclosed logic modules are described as independent units, embodiments may include various combinations and portions of each. Furthermore, while the logic modules are described with reference to the computing device 102, similar logic modules may be implemented by the electronic controller 130.

Figure 3:
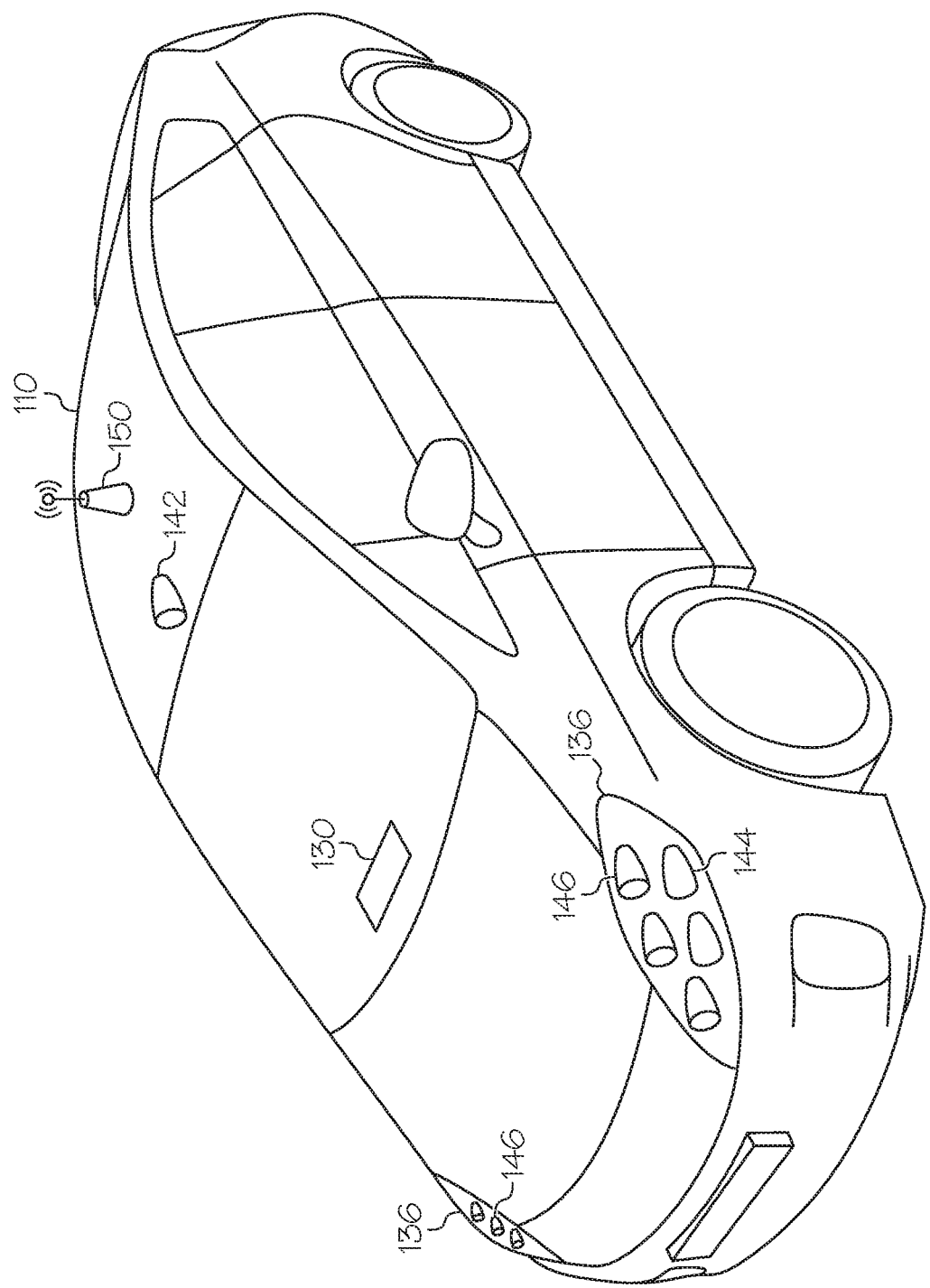
FIG. 3 depicts an illustrative schematic of a vehicle implementing the system for determining a rigid-body transformation between 2D and 3D data according to one or more embodiments shown and described herein.

Referring now to FIG. 3, an illustrative schematic of a vehicle 110 implementing the system 100 for determining a rigid-body transformation between 2D and 3D data is depicted. As depicted, for example, but without limitation, the camera 142 is disposed above the windshield and positioned to view the environment in front of the vehicle 110. However, this is only an example as one or more cameras 142 may be implemented on a vehicle 110 for capturing 2D image data 238A of the environment around the vehicle 110. The vehicle 110 may further include one or more LIDAR sensors 144. As depicted a LIDAR sensor 144 is implemented with the headlamp array, however, this is also merely an example as LIDAR sensors of a LIDAR sensor 144 may be implemented in various locations on the vehicle 110 to capture 3D point cloud data 238B of the environment around the vehicle 110. The vehicle 110 may further include one or more RADAR sensors and systems 146. As depicted a RADAR sensor 146 is implemented with the headlamp array, however, this is also merely an example as RADAR sensors of a RADAR sensor 146 may be implemented in various locations on the vehicle 110 to capture 3D point cloud data 238B of the environment around the vehicle 110. The vehicle 110 may also include an electronic controller 130 configured to capture data from the one or more sensors on the vehicle 110, communicate with external computing resources via network interface hardware 150 such as a computing device 102, and/or execute calibration and/or localization operations as described herein. That is, in some embodiments, the electronic controller 130 may implement one or more of the methods described herein. The vehicle 110 may be an autonomous vehicle or semi-autonomous vehicle. Additionally, although FIG. 3 depicts a vehicle 110, some embodiments may be a mobile robot, automation equipment, manufacturing assembly lines, and the like.

Figure 4:
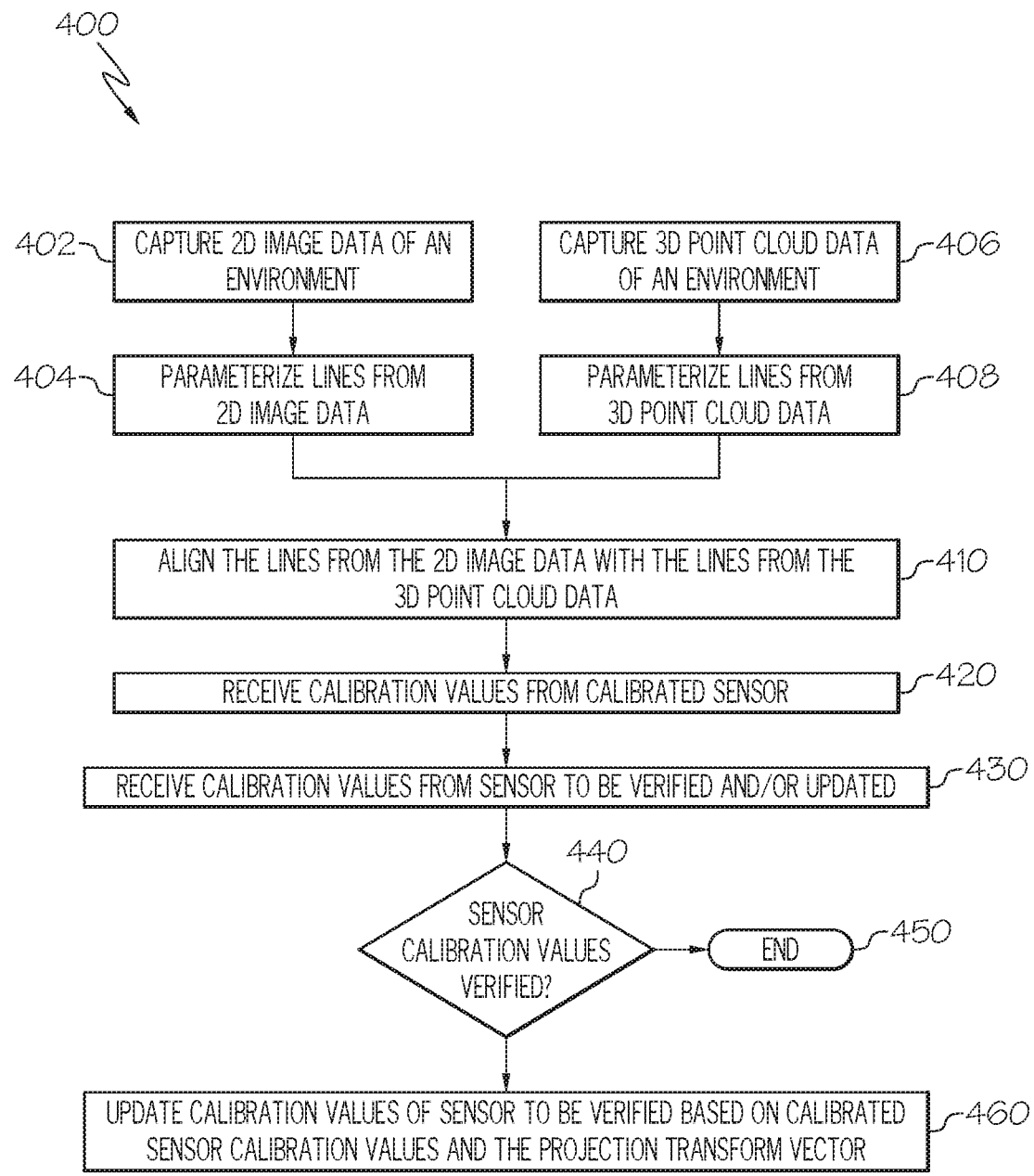
FIG. 4 depicts a flow diagram of an illustrative method for determining a rigid-body transformation between 2D image data and 3D point cloud data to generate a projection transform vector that may be used for calibrating a camera, a LIDAR sensor, or a RADAR sensor according to one or more embodiments shown and described herein.
Figure 5:
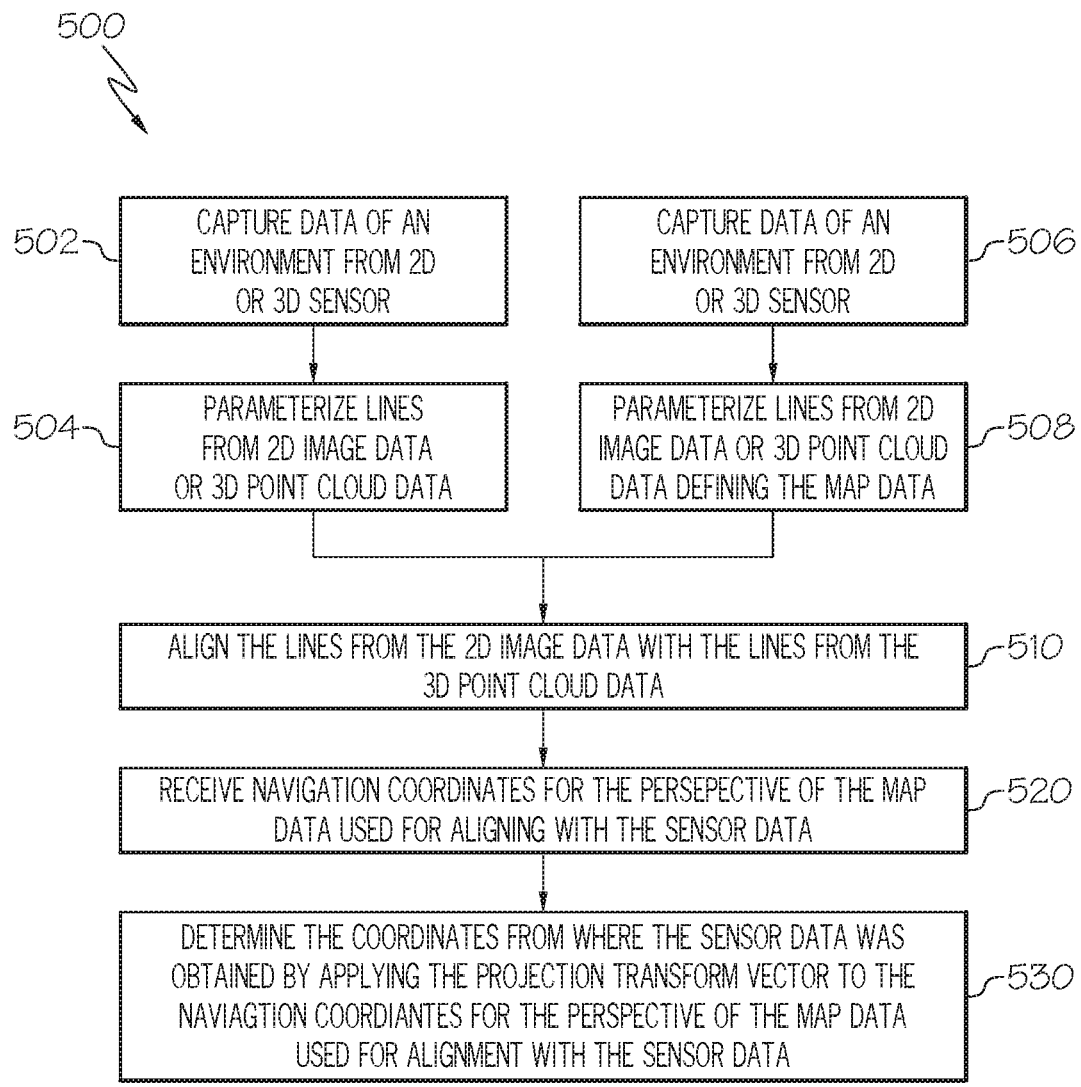
FIG. 5 depicts a flow diagram of an illustrative method for determining a rigid-body transformation between 2D image data and 3D point cloud data to generate a projection transform vector that may be used for localizing a camera, a LIDAR sensor, or a RADAR sensor according to one or more embodiments shown and described herein.

With an understanding of the system 100 and operations performed by the system 100 which are based on determining a rigid-body transformation between 2D image data 238A and 3D point cloud data 238B to generate a projection transform vector, we turn to FIGS. 4 and 5 to more fully describe related methods. Before discussing the two illustrative methods, it should be understood that each of these methods are based on the unique approach described herein of determining parameterized lines from 2D image data 238A and 3D point cloud data 238B, aligning the parameterized lines from the 2D image data 238A and the 3D point cloud data 238B by solving a registration problem formulated as a mixed integer linear program to simultaneously solve for a projection transform vector and/or data association set, and generating and/or outputting a data mesh comprising the 2D image data 238A aligned with the 3D point cloud data 238B based on the projection transform vector. Furthermore, it should be understood that the 2D image data 238A and 3D point cloud data 238B may be collected in real-time or near real-time or may be retrieved from data storage retaining copies of the datasets captured from a time in the past.

Referring to FIG. 4, a flow diagram 400 of an illustrative method for determining a rigid-body transformation between 2D image data 238A (FIG. 2) and 3D point cloud data 238B (FIG. 2) to generate a projection transform vector that may be used for calibrating a camera 142, a LIDAR sensor 144, or a RADAR sensor 146 is depicted. The flow diagram 400 illustrating the method may be implemented by the system 100 depicted and described with reference to FIGS. 1 and 2.

Turning to the flow diagram 400, at block 402, a camera 142 (FIG. 1) or other image sensing device may be configured to capture 2D image data 238A of an environment. The 2D image data 238A captured by the camera 142 may be stored in the data storage component 236 or similar device. At block 404, the system 100 implements, for example, 2D line parameterization logic 234B to parameterize one or more 2D lines from the 2D image data 238A. At block 406, a sensor such as a LIDAR sensor 144 (FIG. 1) or a RADAR sensor 146 (FIG. 1) may be configured to capture 3D point cloud data 238B (FIG. 2) of an environment. The 3D point cloud data 238B (FIG. 2) captured by the sensor may be stored in the data storage component 236 or similar device. At block 408, the system 100 implements, for example, 3D line parameterization logic 234C (FIG. 2) to parameterize one or more 3D lines from the 3D point cloud data 238B. It is understood that the terms "2D lines" and "3D lines" are references to the parameterized lines from the 2D image data 238A and the 3D point cloud data 238B respectively and do not necessarily connote a meaning of dimensionality with respect to the lines. That is, parameterized lines from 2D image data 238A may be defined in 2-dimensional space or 3-dimensional space. Likewise, parameterized lines from 3D point cloud data 238B may be defined in 2-dimensional space or 3-dimensional space, however, more often will be defined in 3-dimensional space.

Once parameterized lines are generated for the two sets of data (e.g., the 2D image data 238A and the 3D point cloud data 238B) for which the rigid-body transformation is to be determined, the system 100 at block 410 implements the alignment logic 234D. That is, the system 100 at block 410 aligns the one or more 2D lines with the one or more 3D lines by solving a registration problem formulated as a mixed integer linear program to simultaneously solve for a projection transform vector and a data association set. As discussed in more detail above, the process of aligning the one or more 2D lines with the one or more 3D lines may include minimizing the $L_1$ norm of Equation 6. As a result of solving the registration problem, that is, aligning the one or more 2D lines with the one or more 3D lines, the system 100 generates a projection transform vector and a data association set. The projection transform vector defines the translation and rotation values for aligning the 2D lines with the 3D lines. The data association set identifies correspondences between the 2D lines and 3D lines.

In some embodiments, data associations are unknown after the parameterization processes are complete. In such instances, an initial guess may be made as to the correspondences that define the data associations and a nearest neighbor heuristic may be applied to establish a data association for use in solving the registration problem.

In some embodiments, once the projection transform vector is determined by the aligning step at block 410, the system 100 may output at least one of a translation value or a rotation value from the projection transform vector determined from aligning the one or more 2D lines with the one or more 3D lines. In some embodiments, the projection transform vector is further utilized to perform a calibration operation for a sensor in the system 100. As such, at block 420 the system 100 may retrieve or receive calibration values for a calibrated sensor. The calibrated sensor may either be the sensor that generated the 2D image data 238A (e.g., the camera 142) or the sensor that generated the 3D point cloud data 238B (e.g., the LIDAR sensor 144 or the RADAR sensor 146). At block 430, the system 100 may retrieve or receive calibration values for the other sensor, the sensor for which the calibration values are to be verified and/or updated. At block 440, the system 100 may generate, based on the calibration values from the calibrated sensor and the projection transform vector, the expected calibration values for the sensor to be verified. In other words, the projection transform vector is instructive as to how the calibrated values of the calibrated sensor should be adjusted such that the two sensors (i.e., the calibrated sensor and the sensor to be verified) generate 2D image data 238A and 3D point cloud data 238B that are aligned in the future.

For example, a camera 142 may be positioned on a vehicle 110 to view an environment from a particular position (e.g., an x-coordinate, y-coordinate, z-coordinate, roll, pitch, and yaw) with reference to the vehicle. A LIDAR sensor 144 may also be implemented on the vehicle 110 to view an area of the environment around the vehicle that at least in part overlaps with that of the camera's field of view. In a calibrated environment, both sensors, where their fields of view overlap, will generate data that correspond to the same points in space. However, either upon installation or over time the LIDAR sensor 144 may become uncalibrated or require verification as to its calibration due to use in the field. The same may be true for the camera 142, however, for purposes of this example, the camera 142 is the calibrated sensor and the LIDAR sensor 144 is the sensor to be verified and/or updated.

The system 100 still referring to block 440, determines whether the expected calibration values match the calibration values of the sensor to be verified. If the values are verified, for example, to be within a predefined margin of error, the verification is complete and the system 100 completes the process of calibration. However, when the expected calibration values do not meet the predefined margin of error when compared to the actual calibration values of the sensor to be verified, then the system 100 at block 460 updates the calibration values of the sensor to be verified. The update may include adjusting the current calibration values of the sensor to be verified based on the projection transform vector. Calibration values that may be adjusted include intrinsic and extrinsic values. In some instances, where the calibration of the sensor may not be able to be adjusted, the system 100 may implement a data transformation process where data collected by the sensor is subsequently transformed based on the projection transform vector.

Referring now to FIG. 5, a flow diagram 500 of an illustrative method for determining a rigid-body transformation between 2D image data 238A (FIG. 2) and 3D point cloud data 238B (FIG. 2) to generate a projection transform vector that may be used for localizing a camera 142 (FIG. 1), a LIDAR sensor 144 (FIG. 1), or a RADAR sensor 146 (FIG. 1) is depicted. At block 502, the system 100 captures data using a sensor such as a camera 142, a LIDAR sensor 144, a RADAR sensor 146, or the like to generate 2D image data 238A or 3D point cloud data 238B of the environment. The 2D image data 238A or 3D point cloud data 238B of the environment may be stored in the in the data storage component 236 (FIG. 2) or similar device. At block 504, the system 100 implements, for example, 2D line parameterization logic 234B (FIG. 2) to parameterize one or more 2D lines from the 2D image data 238A or 3D line parameterization logic 234C (FIG. 2) to parameterize one or more 3D lines from the 3D point cloud data 238B.

At block 506, the system 100 receives or retrieves map data for the environment. The map data may be 3D point cloud data 238B or a compilation of 2D image data 238A defining an environment. Map data may be referred to herein as "prior map data" referring to the fact that the map data may be generated at some time prior to the operation of localization. In some embodiments, the map data is a 3D model of the environment in which a plurality of perspective views may be selected. The perspective views each may be defined by navigation coordinates such as longitude, latitude, altitude, roll, pitch, and/or yaw. The system 100 may select a perspective view in the map data to register with data captured by a sensor to determine where in the environment the sensor is located when it captured the data (e.g., a 2D image or 3D point cloud. This operation has been referred to herein as localization.

In some embodiments, for example, the data captured in blocks 502 and 506 may be completed in 2 stages. In the first stage a vehicle drives a route and data from a global positioning system (GPS), an inertial measurement unit (IMU), a LIDAR sensor 144, and cameras 142 is collected and combined in an offline simultaneous localization and mapping (SLAM) system to generate a map of 3D line features of the environment. In the second stage, the vehicle may drive the route again to gather 2D line feature detections to use in the evaluation.

At block 508, the system 100 implements, for example, 2D line parameterization logic 234B (FIG. 2) to parameterize one or more 2D lines from the map data or the 3D line parameterization logic 234C (FIG. 2) to parameterize one or more 3D lines from the map data depending the format of the map data (i.e., whether it is 2D image data 238A or 3D point cloud data 238B). Once parameterized lines are generated for the two sets of data (e.g., map data and the 2D image data 238A or the 3D point cloud data 238B) for which the rigid-body transformation is to be determined, the system 100 at block 510 implements the alignment logic 234D.

That is, the system 100 at block 510 aligns the one or more lines obtained from the 2D image data 238A or the 3D point cloud data 238B with the one or more lines obtained from map data by solving a registration problem formulated as a mixed integer linear program to simultaneously solve for a projection transform vector and a data association set.

As discussed in more detail above, the process of aligning includes minimizing the $L_1$ norm of Equation 6. As a result of solving the registration problem, the system 100 generates a projection transform vector and a data association set. The projection transform vector defines the translation and rotation values for aligning the lines obtained from the 2D image data 238A or the 3D point cloud data 238B with the lines obtained from map data.

In some embodiments, once the projection transform vector is determined by the aligning step at block 510, the system 100 may output at least one of a translation value or a rotation value from the projection transform vector determined from aligning the one or more 2D lines with the one or more 3D lines. In some embodiments, the projection transform vector is further utilized to perform a localization operation of a sensor in the environment. As such, at block 520 the system 100 may retrieve or receive navigation coordinates for the perspective of the map data used for aligning with the sensor data. For example, the perspective may describe a location (e.g., longitude, latitude, and/or altitude) and a point of view (e.g., roll, pitch, and/or yaw) of the map data (e.g., a 3D point cloud of the environment from a predefined location).

At block 530, the system 100 may implement localization logic 234F (FIG. 2). The localization logic 234F determines the location of a sensor capturing the 2D image data 238A or the 3D point cloud data 238B in the environment. The localization logic 234F may achieve this by applying the projection transform vector (i.e., for example applying the translation and/or rotation values) to the navigation coordinates corresponding to the perspective of the prior map data used for aligning the map data with the sensor data. In other words, given the navigation coordinates of the map data and the translation and rotation values defined in the projection transform vector the coordinates from where the 2D image data 238A or the 3D point cloud data 238B of the environment was captured from can be determined. Accordingly, localization of the vehicle, robot, or other system in an environment may be determined.

It should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Furthermore, while the two aforementioned methods refer generally to calibration processes and localization processes, the underlying concept of parameterizing lines from 2D image data 238A and 3D point cloud data 238B and then aligning the one or more 2D lines with the one or more 3D lines by solving a registration problem formulated as a mixed integer linear program to simultaneously solve for a projection transform vector and a data association set, is generally the same.

Figure 6A:
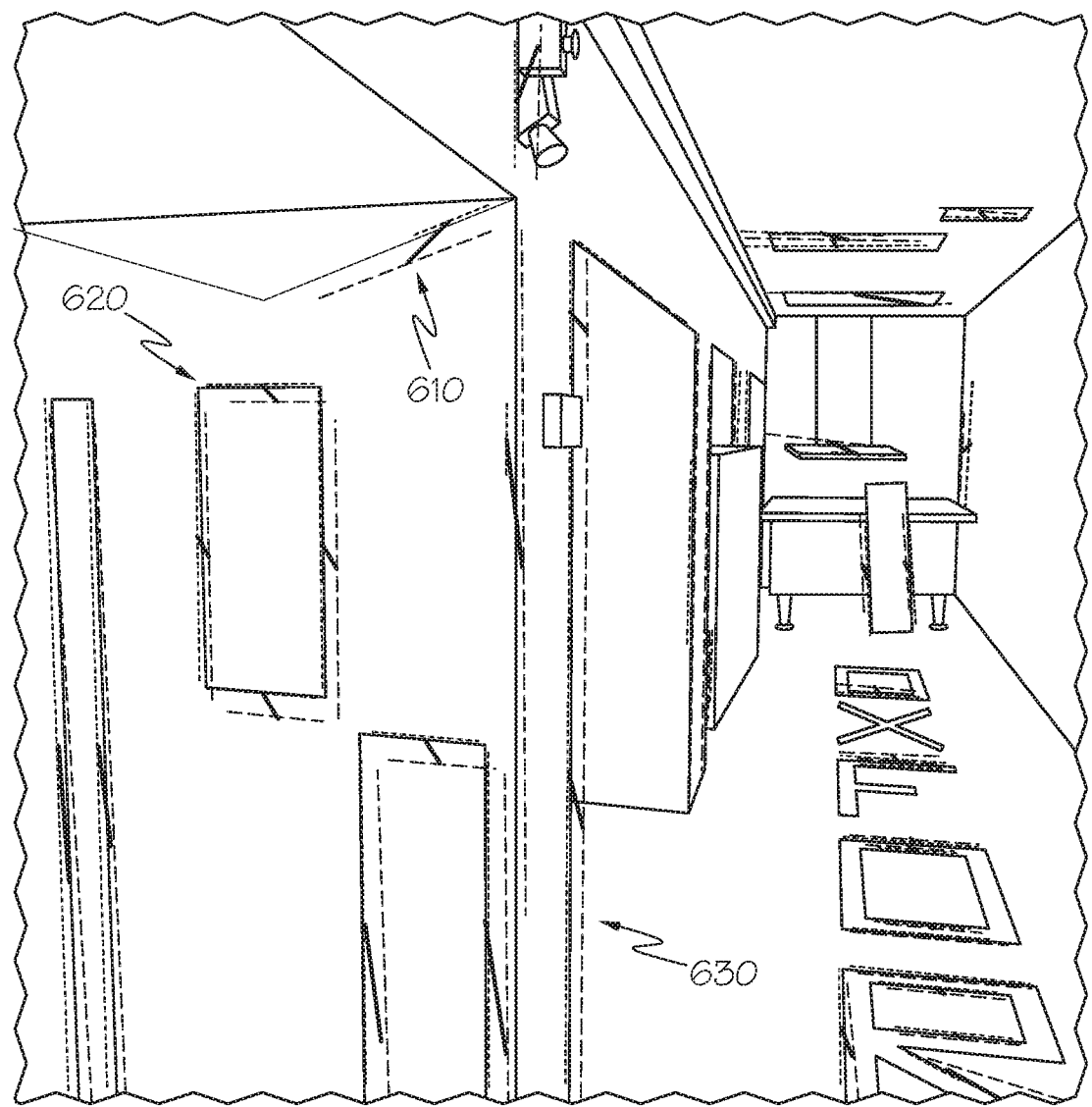
FIG. 6A depicts an illustrative representation of the alignment of the parameterized lines from 2D image data and parameterized lines from 3D point cloud data based on the approach described in Přibyl.
Figure 6B:
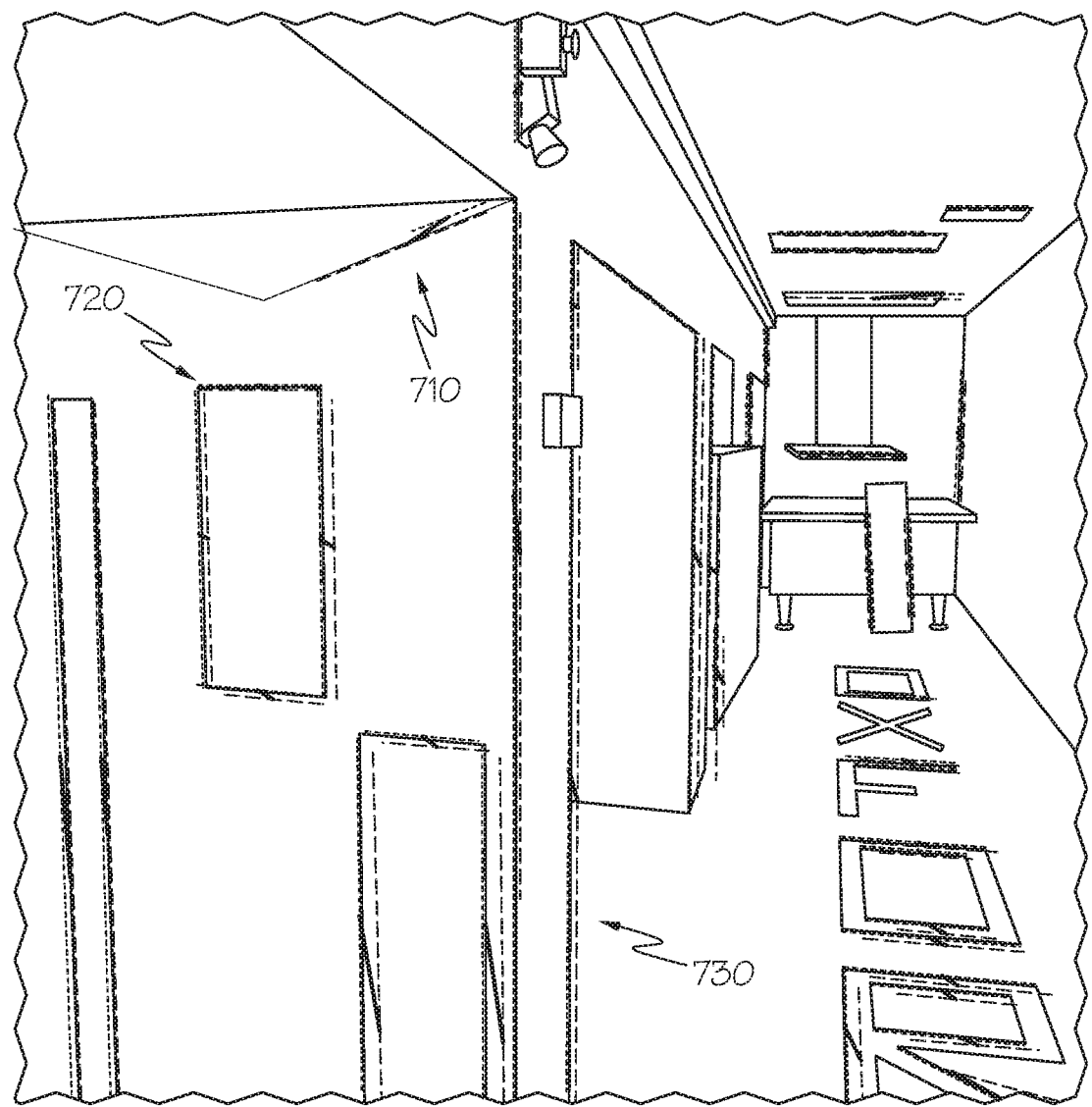
FIG. 6B depicts an illustrative representation of the alignment of the parameterized lines from 2D image data and parameterized lines from 3D point cloud data according to one or more embodiments shown and described herein.

For additional understanding with respect to the improvements provided by the present concept of determining the rigid-body transform between 2D image data and 3D point cloud data utilizing a registration problem formulated as a mixed integer linear program, an evaluation between the approach disclosed herein and an approach described in Přibyl et al. titled "Camera pose estimation from lines using Plücker coordinates," published by the Proceedings of the British Machine Vision Conference in 2016 (hereinafter "Přibyl") was performed. FIGS. 6A and 6B provide illustrative representations of the alignment, also referred to as registration, of the parameterized lines from 2D image data with the parameterized lines from 3 D point cloud data. In particular, FIG. 6A provides an illustrative representation of the alignment of the parameterized lines from 2D image data and parameterized lines from 3D point cloud data based on the approach described in Přibyl. FIG. 6B provides an illustrative representation of the alignment of the parameterized lines from 2D image data and parameterized lines from 3D point cloud data based on the systems and methods described herein. When viewed together it is apparent that the systems and methods described herein deliver improved alignments between parameterized lines from 2D image data and parameterized lines from 3D point cloud data.

In FIGS. 6A and 6B, the short dashed lines represent the parameterized lines from the 2D image data and the long dashed lines represent the parameterized lines from the 3D point cloud data. Additionally, the solid bold lines represent the transform or data associations between the parameterized lines from 2D image data and the parameterized lines from 3D point cloud data. As discussed above, the goal is to align the parameterized lines from 2D image data and the parameterized lines from 3D point cloud data.

To evaluate the performance of the systems and methods described herein and the approach disclosed in Přibyl, the publically available dataset Oxford VGG Multiview Dataset (URL: http://www.robots.ox.ac.uk/~vgg/data/mview/) was utilized. The Oxford "Corridor" Dataset was processed utilizing the present approach and the approach in Přibyl. Přibyl solves it cost function by minimizing the $L_2$ norm whereas the present approach minimizes the $L_1$ norm of its cost function (e.g., the mixed integer linear program, Eq. 6), a different cost function from Přibyl. Observing the alignment of the parameterized lines 610 with the alignment of parameterized lines 710, which were aligned using the systems and methods described herein, it is apparent that the parameterized lines 710 are more closely aligned than the parameterized lines 610. Additionally, observing the alignment of the parameterized lines 620 with the alignment of parameterized lines 720, which were aligned using the systems and methods described herein, it is apparent that the parameterized lines 720 are more closely aligned than the parameterized lines 620. Furthermore, observing the alignment of the parameterized lines 630 with the alignment of parameterized lines 730, which were aligned using the systems and methods described herein, it is apparent that the parameterized lines 730 are more closely aligned than the parameterized lines 630. These are only a few examples of the better alignment that is achieved through the systems and methods described herein as compared to the approach in Přibyl.

Table 1 below further depicts the results of the evaluation depicted in FIGS. 6A and 6B.

| Sequence | $L_2$ (Přibyl) | | $L_1$ (systems and methods disclosed herein) | |
|---|---|---|---|---|
| | Translation (m) | Rotation (degrees) | Translation (m) | Rotation (degrees) |
| Oxford Corridor | 0.119 | 0.33 | 0.061 | 0.26 |

It should now be understood that embodiments described herein are directed to systems and methods for determining a rigid-body transformation between 2D image data and 3D point cloud data. The systems and methods for determining the rigid-body transformation between 2D image data and 3D point cloud data that are described herein may be implemented in applications such as mobile robotics, autonomous vehicles, automation equipment, manufacturing assembly lines, and the like. The process of determining a rigid-body transformation between 2D image data and 3D point cloud data may be utilized by these applications for operations such as sensor calibration and/or localization in an environment of a prior map. In embodiments, the systems and methods include determining parameterized lines from 2D image data and 3D point cloud data, aligning the parameterized lines from the 2D image data and the 3D point cloud data by solving a registration problem formulated as a mixed integer linear program to simultaneously solve for a projection transform vector and/or data association set, and generating and/or outputting a data mesh comprising the 2D image data aligned with the 3D point cloud data based on the projection transform vector.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system comprising:
   a first sensor configured to capture image data of an environment;
   a second sensor configured to capture point cloud data of the environment;
   a computing device communicatively coupled to the first sensor and the second sensor, wherein the computing device is configured to:
      receive the image data from the first sensor and the point cloud data from the second sensor;
      parameterize one or more 2D lines from the image data;
      parameterize one or more 3D lines from the point cloud data;
      align the one or more 2D lines with the one or more 3D lines by solving a registration problem formulated as a mixed integer linear program to simultaneously solve for a projection transform vector and a data association set; and generate a data mesh comprising the image data aligned with the point cloud data based on the projection transform vector.

2. The system of claim 1, wherein the computing device is further configured to:
receive calibration values for the first sensor and the second sensor, wherein the first sensor is a calibrated sensor;
generate expected calibration values for the second sensor based on the calibration values for the first sensor and the projection transform vector;
determine whether the calibration values for the second sensor match the expected calibration values within a predefined margin of error; and
in response to determining that the calibration values for the second sensor do not match the expected calibration values within the predefined margin of error, update the calibration values for the second sensor based on the projection transform vector such that the second sensor is calibrated with reference to the calibrated first sensor.

3. The system of claim 1, wherein the computing device is further configured to:
receive calibration values for the first sensor and the second sensor, wherein the second sensor is a calibrated sensor;
generate expected calibration values for the first sensor based on the calibration values for the second sensor and the projection transform vector;
determine whether the calibration values for the first sensor match the expected calibration values within a predefined margin of error; and
in response to determining that the calibration values for the first sensor do not match the expected calibration values within the predefined margin of error, update the calibration values for the first sensor based on the projection transform vector such that the first sensor is calibrated with reference to the calibrated second sensor.

4. The system of claim 3, wherein the calibration values include extrinsic parameters and intrinsic parameters.

5. The system of claim 1, wherein solving the registration problem formulated as the mixed integer linear program comprises minimizing the $L_1$ norm.

6. The system of claim 1, wherein a data association between the one or more 2D lines and the one or more 3D lines is not initially known such that an initial guess as to a correspondence that defines the data association and a nearest neighbor heuristic are applied to solve the registration problem.

7. The system of claim 1, wherein a field of view of the environment captured in the image data of the environment and a field of view of the environment captured in the point cloud data of the environment include at least a portion of a view of the environment that overlaps.

8. The system of claim 1, wherein the second sensor comprises at least one of a LIDAR sensor, a RADAR sensor, or a RGB-D camera.

9. A system comprising:
a first sensor configured to capture data defining an environment, wherein the data comprises at least one of image data or point cloud data;
a computing device communicatively coupled to the first sensor, wherein the computing device is configured to:
receive data from the first sensor;
retrieve map data of the environment;
parameterize one or more first lines from the data received from the first sensor, wherein the parameterized one or more first lines are 2D lines or 3D lines;
parameterize one or more second lines from the map data, wherein the parameterized one or more second lines are 2D lines when the parameterized one or more first lines are 3D lines and the parameterized one or more second lines are 3D lines when the parameterized one or more first lines are 2D lines;
align the one or more first lines parameterized from the data received from the first sensor with the one or more second lines parameterized from the map data by solving a registration problem formulated as a mixed integer linear program to simultaneously solve for a projection transform vector and a data association set; and
generate a data mesh comprising the data received from the first sensor aligned with the map data based on the projection transform vector.

10. The system of claim 9, wherein the computing device is further configured to:
receive navigation coordinates corresponding to the map data; and
apply the projection transform vector to the navigation coordinates to determine coordinates at which the data from the first sensor of the environment was captured, thereby localizing the first sensor in the environment.

11. The system of claim 10, wherein the navigation coordinates corresponding to the map data defines a longitude, a latitude, and an altitude of a perspective of the environment aligned with data from the first sensor.

12. The system of claim 9, wherein the first sensor is a camera and the data is image data of the environment.

13. The system of claim 9, wherein the data captured by the first sensor is the point cloud data of the environment.

14. The system of claim 9, wherein the map data includes image data of at least one perspective of the environment.

15. The system of claim 9, wherein the map data includes a 3D model of the environment, wherein the 3D model comprises at least one of image data or the point cloud data captured from multiple locations in the environment.

16. A system comprising:
a computing device, wherein the computing device is configured to:
retrieve image data captured by a camera of an environment;
retrieve point cloud data of the environment;
parameterize one or more 2D lines from the image data;
parameterize one or more 3D lines from the point cloud data;
align the one or more 2D lines parameterized from the image data with the one or more 3D lines parameterized from the point cloud data by solving a registration problem formulated as a mixed integer linear program to simultaneously solve for a projection transform vector and a data association set; and
generate a data mesh comprising the image data aligned with the point cloud data based on the projection transform vector.

17. The system of claim 16, wherein solving the registration problem formulated as the mixed integer linear program comprises minimizing an $L_1$ norm.

18. The system of claim 16, wherein a data association between the one or more 2D lines parameterized from the image data and the one or more lines 3D parameterized from the point cloud data is not initially known such that an initial guess as to a correspondence that defines the data association and a nearest neighbor heuristic are applied to solve the registration problem.

19. The system of claim 16, wherein a field of view of the environment captured in the image data of the environment and a field of view of the environment captured in the point cloud data of the environment include at least a portion of a view of the environment that overlaps.

20. The system of claim 16, further comprising a vehicle comprising one or more sensors for capturing data corresponding to the environment, wherein the one or more sensors are communicatively coupled to the computing device such that data captured by the one or more sensors is capable of being transmitted to and processed by the computing device.

* * * * *

UNITED STATES PATENT AND TRADEMARK OFFICE
CERTIFICATE OF CORRECTION

PATENT NO. : 11,393,127 B2
APPLICATION NO. : 16/834466
DATED : July 19, 2022
INVENTOR(S) : Steven A. Parkison et al.

It is certified that error appears in the above-identified patent and that said Letters Patent is hereby corrected as shown below:

On the Title Page

In page 2, Column 1, item (56), U.S. patent documents, cite no. 1, delete "Gao" and insert --Gao et al.--, therefor.

In page 2, Column 2, item (56), other publications, cite no. 4, delete "Goebbels Steffen et al:" and insert --Goebbels Steffen et al.,--, therefor.

In page 2, Column 2, item (56), other publications, cite no. 5, delete "Izatt Gregory et al:" and insert --Izatt Gregory et al.,--, therefor.

In the Drawings

Sheet 5, FIG. 5, block 520, delete "PERSEPECTIVE" and insert --PERSPECTIVE--, therefor.

In the Specification

In Column 11, Line 36, eq. 4, delete "$M^{\{m,n\}}$" and insert --$M^{\{n,m\}}$--, therefor.

In Column 19, Line(s) 41, delete "URL: http://www.robots.ox.ac.uk/~vgg/data/mview/" and insert --URL: https://www.robots.ox.ac.uk/~vgg/data/mview/--, therefor.

Signed and Sealed this
Twenty-second Day of November, 2022

Katherine Kelly Vidal
*Director of the United States Patent and Trademark Office*